Feb. 20, 1951     D. L. MORRIS     2,542,938
TOOL SETTER FOR LATHES
Filed June 29, 1949
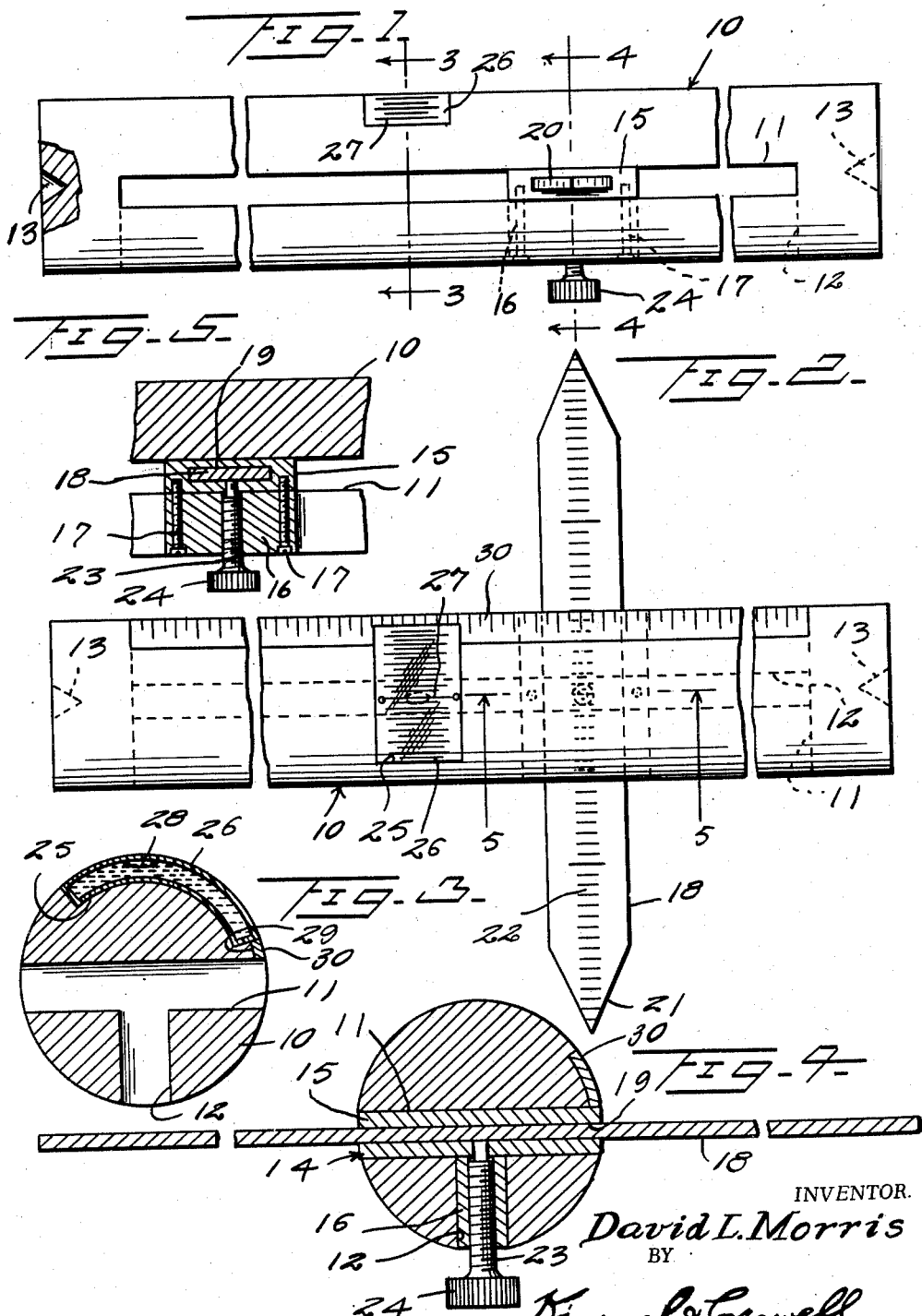
INVENTOR.
David L. Morris
BY
Kimmel & Crowell
ATTORNEYS Patented Feb. 20, 1951

2,542,938

UNITED STATES PATENT OFFICE 2,542,938

TOOL SETTER FOR LATHES

David L. Morris, Sidney, Ohio

Application June 29, 1949, Serial No. 102,078

2 Claims. (Cl. 33—185)

This invention relates to a gauge for setting tools in lathes.

An object of this invention is to provide a gauge whereby the height of one or more tools of a lathe can be very finely gauged, and the lathe set for cutting to a predetermined diameter.

Another object of this invention is to provide a gauge which will eliminate mistakes which are frequently made in setting of the tools and will also eliminate wastage in improperly cut work.

A further object of this invention is to provide a gauge of this kind which is simple in construction and can be easily and quickly set up.

In certain lathes, at least one tool carriage is movable horizontally, and one or more other carriages are movable in either a horizontal plane or in a plane inclined to the horizontal, with the latter carriage or carriages movable at right angles to the movement of the first carriage or carriages. The gauge herein disclosed is adaptable to all of the carriages so that each tool can be accurately set for movement in a plane parallel to the movement of its respective carriage.

With the above and other objects in view, my invention consists in the arrangement, combination and details of construction disclosed in the drawing and specification, and then more particularly pointed out in the appended claims.

In the drawing,

Figure 1 is a detail side elevation, partly broken away and in section, of a gauge for use in setting tools in lathes, Figure 2 is a plan view partly broken away of the device, Figure 3 is a sectional view taken on the line 3—3 of Figure 1, Figure 4 is a sectional view taken on the line 4—4 of Figure 1, Figure 5 is a sectional view taken on the line 5—5 of Figure 2.

Referring to the drawing, the numeral 10 designates generally an elongated bar or shaft which is provided at the opposite ends thereof with tapered recesses 13 within which the center points of a lathe are adapted to engage. The bar 10 is provided with a longitudinally extending opening 11 which terminates at each end thereof inwardly from the ends of the bar 10 and a right angularly disposed elongated opening 12 is formed in the bar 10 and communicates with the opening 11. The two openings 11 and 12 form a T-shaped opening or guide for an adjustable slide member generally designated as 14.

The slide member 14 comprises a flat body 15 which is slidably disposed in the horizontal opening 11 and also includes a right angularly disposed key or shank 16 slidably engaging in the opening 12. The key or shank 16 is secured to the body 15 by means of fastening means 17. An elongated gauge bar 18 is loosely disposed in an opening 19 formed in the body 15 and is adapted to project right angularly with respect to the length of the bar 10.

The gauge bar 18 is disposed with the upper side 20 thereof coplanar with the longitudinal axis of the bar 10 and the opposite ends of the gauge bar 18 are pointed or tapered as indicated at 21. The gauge bar 18 is provided with suitable graduations 22 on the upper side thereof so that this gauge bar can be accurately positioned with respect to the body or carriage 14. The gauge bar 18 is adjustably secured in the opening guide 19 by means of a set screw 23 having a head 24, and the set screw 23 is threaded through the shank or key member 16.

The bar 10 is provided in the upper side thereof with an arcuate recess 25 within which a spirit level 26 is adapted to be secured, and the level 26 includes gauge marks 27 disposed lengthwise of the bar 10 so that when the bubble 28 is centered between the zero gauge marks 27, the gauge bar 18 will be horizontally disposed. The bar 10 also has formed therein a longitudinally extending recess 29 within which a graduated strip 30 is adapted to be positioned so that the gauge bar 18 may be accurately adjusted lengthwise of the bar 10 in addition to being accurately adjusted transversely or at right angles to the bar 10.

In the use and operation of this device, the bar 10 is secured between the center points of a lathe with the center points engaging in the sockets or center recesses 13. The gauge bar 18 is adjusted to a horizontal position, the latter being determined by the zero mark on spirit level 26. The gauge bar 18 may be adjusted lengthwise of the bar 10 to a selected position and may be transversely adjusted by loosening the set screw 23. The tool at the front of the lathe may be adjusted with respect to the gauge bar 18 and when this front tool has been accurately adjusted, the rear or other tool or tools may be accurately adjusted by turning the gauge bar to the angle of rear carriage with respect to the horizontal. The angle of the rear carriage being known for each lathe, the bar 10 is angularly adjusted with the spirit level calibrations as a guide so that the gauge bar 18 will be parallel with the rear tool and rear carriage. The spacing between the several carriages, both front and rear is determined by the scale 30.

With a tool setting gauge as hereinbefore described, two or more opposed tools may be accurately set so that they will cut the work to the desired degree, thereby eliminating the spoiling of a work piece during the experimental setting of the tools.

I do not mean to confine myself to the exact details of construction herein disclosed but claim all varations falling within the purview of the appended claims.

What I claim is:

1. A lathe tool setting gauge comprising an elongated round bar formed with center point recesses in the ends thereof whereby said bar may be supported between a pair of center points, said bar having a T-shaped opening extending lengthwise thereof, a T-shaped slide engaging in said slot and formed with an opening transversely to the length of said bar, a longitudinally curved calibrated spirit level disposed transversely of and countersunk in said bar, an elongated gauge member disposed in said opening of said slide and projecting from opposite sides of said bar, the upper side of said gauge member being coplanar with the longitudinal axis of said bar, calibrations on the upper side of said gauge member, and means securing said gauge member in endwise adjusted position in said slide.

2. A lathe tool setting gauge comprising an elongated round bar formed with center point recesses in the ends thereof whereby said bar may be supported between a pair of center points, said bar having a T-shaped opening extending lengthwise thereof, a T-shaped slide engaging in said slot and formed with an opening transversely to the length of said bar, a calibrated spirit level carried by said bar, an elongated gauge member disposed in said opening of said slide and projecting from opposite sides of said bar, the upper side of said gauge member being coplanar with the longitudinal axis of said bar, means securing said gauge member in endwise adjusted position in said slide, and a calibrated scale countersunk in said bar lengthwise thereof and along the upper edge of said slot whereby the lengthwise position of said slide may be indicated.

DAVID L. MORRIS.

REFERENCES CITED

The following references are of record in the file of this patent:

UNITED STATES PATENTS

| Number | Name | Date |
| --- | --- | --- |
| 2,197,278 | Sverdahl | Apr. 16, 1940 |

FOREIGN PATENTS

| Number | Country | Date |
| --- | --- | --- |
| 309,435 | Germany | Nov. 18, 1918 |
| 328,295 | Germany | Oct. 27, 1920 |
| 552,326 | Great Britain | Apr. 1, 1943 |